United States Patent
Haas et al.

(10) Patent No.: US 12,521,806 B2
(45) Date of Patent: Jan. 13, 2026

(54) METHOD AND DEVICE FOR CONTROLLING THE FEED RATE OF CIRCULAR SAW BLADES

(71) Applicant: FRAMAG INDUSTRIEANLAGENBAU GMBH, Frankenburg (AT)

(72) Inventors: Roland Haas, St. Georgen an der Gusen (AT); Heimo Huemer, Oberndorf (AT); Andreas Kellner, Linz (AT)

(73) Assignee: FRAMAG INDUSTRIEANLAGENBAU GMBH, Frankenburg (AT)

( * ) Notice: Subject to any disclaimer, the term of this patent is extended or adjusted under 35 U.S.C. 154(b) by 197 days.

(21) Appl. No.: 18/578,191

(22) PCT Filed: Jul. 11, 2022

(86) PCT No.: PCT/EP2022/069302
§ 371 (c)(1),
(2) Date: Jan. 10, 2024

(87) PCT Pub. No.: WO2023/285369
PCT Pub. Date: Jan. 19, 2023

(65) Prior Publication Data
US 2024/0335892 A1  Oct. 10, 2024

(30) Foreign Application Priority Data

Jul. 15, 2021 (AT) ............................. A 50583/2021

(51) Int. Cl.
*B23D 61/02* (2006.01)
*B23D 59/00* (2006.01)
(Continued)

(52) U.S. Cl.
CPC ......... *B23D 61/021* (2013.01); *B23D 59/001* (2013.01); *B23Q 5/04* (2013.01); *B23Q 15/26* (2013.01)

(58) Field of Classification Search
CPC ............................ B23D 61/021; B23D 59/001
See application file for complete search history.

(56) References Cited

U.S. PATENT DOCUMENTS 5,694,821 A * 12/1997 Smith .................. B23D 59/002
83/72
5,861,564 A  1/1999 Lister et al.
(Continued)

FOREIGN PATENT DOCUMENTS

| CH | 653 600 | 1/1986 |
| DE | 42 02 724 | 8/1993 |

(Continued)

OTHER PUBLICATIONS

Int'l Search Report (Form PCT/ISA/210) conducted in Int'l Appln No. PCT/EP2022/069302 (Nov. 8, 2022).
(Continued)

*Primary Examiner* — Sean M Michalski
(74) *Attorney, Agent, or Firm* — GREENBLUM & BERNSTEIN, P.L.C.

(57) ABSTRACT

A method and device for controlling the feed rate of a saw blade which is provided with teeth and rotates about a center point relative to a workpiece during a machining process. During a rotation of the saw blade about the center point, the feed rate is selected differently during a machining process effected by teeth of different sectors of the saw blade, wherein the feed rate is selected to be lower during a machining process effected by teeth of sectors having larger radial spacing of the teeth from the center point than during a machining process effected by teeth of sectors having smaller radial spacing of the teeth from the center point. In (Continued)

Figure 1:
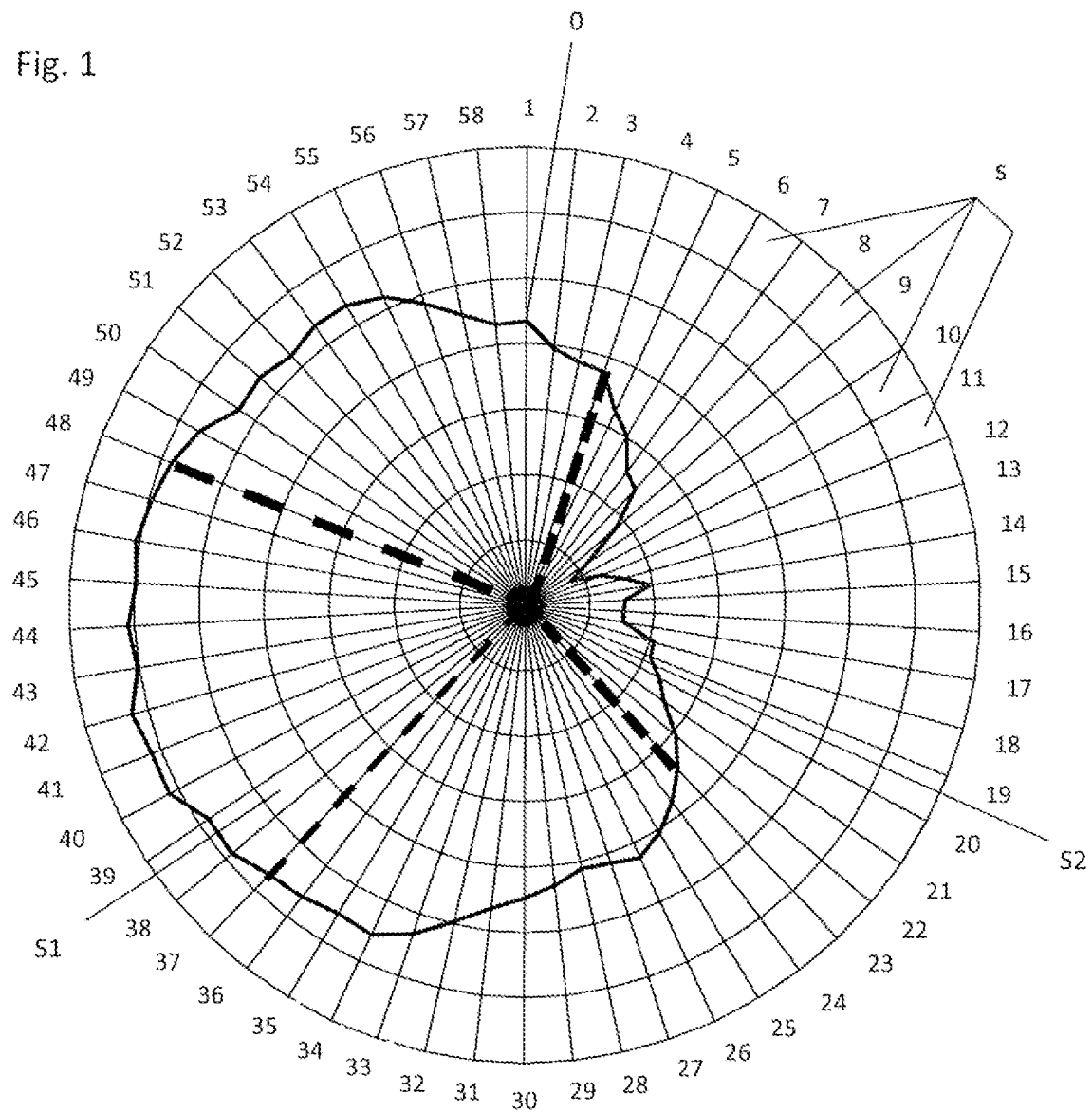

this way, the operation of the saw blade can be optimized and the service life can be increased.

5 Claims, 2 Drawing Sheets

(51) Int. Cl.
*B23Q 5/04* (2006.01)
*B23Q 15/26* (2006.01)

(56) References Cited

U.S. PATENT DOCUMENTS

| | | | | |
|---|---|---|---|---|
| 7,853,350 | B2* | 12/2010 | Jou | B23Q 15/12 |
| | | | | 318/560 |
| 10,245,660 | B2* | 4/2019 | Myrfield | B23D 59/002 |
| 10,300,629 | B2* | 5/2019 | Kaneider | B28D 1/042 |
| 10,953,509 | B2* | 3/2021 | Baratta | B23Q 15/013 |
| 11,130,185 | B2* | 9/2021 | Read | B27B 33/02 |
| 2008/0195244 | A1* | 8/2008 | Jou | B23Q 15/12 |
| | | | | 318/560 |
| 2016/0263768 | A1* | 9/2016 | DeCicco | B23D 59/001 |
| 2017/0274489 | A1* | 9/2017 | Baratta | B23Q 17/0985 |
| 2019/0210129 | A1* | 7/2019 | Read | B23D 61/025 |
| 2020/0379432 | A1* | 12/2020 | Huang | B23Q 17/09 |
| 2021/0170510 | A1* | 6/2021 | Chi | B23D 57/0007 |
| 2021/0178550 | A1* | 6/2021 | Iida | B23Q 15/26 |
| 2021/0178621 | A1* | 6/2021 | Iida | B26D 3/065 |
| 2021/0402539 | A1* | 12/2021 | Baratta | B23Q 3/15546 |

FOREIGN PATENT DOCUMENTS

| | | |
|---|---|---|
| DE | 44 05 660 | 8/1995 |
| DE | 196 34 336 | 2/1998 |
| DE | 100 23 566 | 12/2001 |
| DE | 20 2017 103 056 | 10/2018 |
| DE | 10 2017 126 434 | 5/2019 |
| EP | 0 403 908 | 12/1990 |
| EP | 0 949 480 | 10/1999 |
| EP | 0 969 340 | 1/2000 |
| GB | 1072569 | 6/1967 |
| WO | 01/07868 | 1/2001 |

OTHER PUBLICATIONS

Int'l Written Opinion (Form PCT/ISA/237) conducted in Int'l Appln No. PCT/EP2022/069302 (Nov. 8, 2022).

* cited by examiner

METHOD AND DEVICE FOR CONTROLLING THE FEED RATE OF CIRCULAR SAW BLADES

The invention relates to a method for controlling the feed rate for a saw blade provided with teeth and rotating about a center of rotation relative to a workpiece during a cutting process, with sector areas each having one tooth or a plurality of teeth lying next to one another being definable on the saw blade, according to the preamble of claim 1. The invention further relates to a cutting device comprising a saw blade provided with teeth, a drive device for rotating the saw blade about a center of rotation and a feed device for achieving a relative movement of the saw blade to a workpiece, the feed device comprising a control unit for controlling the feed rate of the saw blade relative to the workpiece and the saw blade has sector areas, each with one tooth or a plurality of teeth lying next to one another, according to the preamble of claim 4.

During the cutting operation, the teeth of the saw blade are heavily loaded. The teeth can be formed or screwed, wherein in the latter case the saw blades are sometimes also referred to as disk milling cutters but, however, are to be considered in the following to be included by the term "saw blades". By suitable control of the machining process, an attempt is made to keep the load as low as possible while maintaining an optimum cutting result. The machining process itself is carried out with the aid of a control which preferably controls the cutting parameters such as the rotational speed of the saw blade and the feed rate (feed speed) of the saw blade in an automated manner. The monitoring of the state of the saw blade plays an increasingly important role. In this case, geometric, static and dynamic analyses of the saw blade in the idle state are determined with the aid of sensors, during idling as well as during the machining operation, and conclusions about the load of the saw blade are drawn from these analyses in order to correspondingly control the machining process, or to detect excessive loads early and to take appropriate maintenance or repair measures. These sensors can be cameras, force or strain gauges, directional microphones, piezo sensors and the like.

In DE 19634336 A1, for example, a device and a method for measuring the saw blade toothing of circular saw blades, in particular for measuring the tooth shape, tooth pitch, the tooth height (tooth depth) as well as the round and flat run are described by means of optical scanning methods.

DE 100 23 566 A1 shows a device and a method for optically checking the saw blades and the individual saw teeth.

EP 0949480 A2 describes a device for measuring the geometry of the saw blades in order to determine essential parameters such as, for example, rake angles and clearance angles on the teeth.

EP 0403908 A2 shows the measurement of a machining tool with a camera.

GB 1072569 A, CH 653600 A5, WO 0107868 A1 and U.S. Pat. No. 5,861,564 A describe further apparatuses and methods for optically measuring the geometry of saw teeth.

DE 202017103056 U and DE 102017126434 A1 disclose the detection of parameters for the measurement and monitoring of saw blades during operation. EP 0 969 340 A1 describes the monitoring of the actual drive current during the operation of a saw blade and the comparison thereof with a setpoint drive current and a corresponding control of the saw blade.

In the cited prior art, a geometric measurement of the saw blade is used to detect loads or deformations of the saw blade or of its teeth early and to take appropriate maintenance or repair measures.

The aim of the invention, on the other hand, is to reduce loads on the saw blade, so that maintenance or repair measures can be avoided as long as possible and the service life is increased.

This object is achieved by the features of claim 1. Claim 1 relates to a method for controlling the feed rate for a saw blade provided with teeth and rotating about a center of rotation relative to a workpiece during a cutting process, with sector areas each having one tooth or a plurality of teeth lying next to one another being definable on the saw blade.

According to the invention, it is proposed that, during one revolution of the saw blade around the center of rotation, the feed rate is selected differently during a cutting process caused by teeth of different sector areas of the saw blade, the radial distance of the teeth or the average radial distance of the plurality of adjacent teeth of different sector areas differs and the feed rate is chosen to be smaller during a cutting process effected by teeth of sector areas with a larger radial distance of the teeth from the center of rotation than during one effected by teeth of sector areas with a smaller radial distance of the teeth from the center of rotation. The method according to the invention reduces loads of the saw blade by a combination of a geometric state monitoring of the saw blade with a suitable control of the machining process. The applicant has found that in the course of production, assembly or operation of saw blades, sector areas with a respective tooth or a plurality of teeth lying next to one another are sometimes being formed, wherein the radial distance of the teeth or the average radial distance of the plurality of adjacent teeth of different sector areas are different. These deviations are usually in the form of an eccentricity of the saw blade with a first sector area of the saw blade with a largest average radial distance of the teeth of this first sector area and a second sector area, mostly opposite sector area of the saw blade with a smallest average radial distance of the teeth of this second sector area. Observations of the applicant show that wear and fracture of teeth occur increasingly in segment regions with a larger radial distance, wherein these deviations from the average radial distance of the teeth of the saw blade are in the range from micrometers to hundredths of a millimeter for a radius of the saw blade in the range of meters. The distance between the tooth tip and the center of rotation can be used as the radial distance of the teeth, since it can be easily detected in terms of measurement technology, but it would also be conceivable to use other reference points for determining the radial distances. By measuring the radial distance of each tooth by methods known per se, it can be determined whether sector areas according to the invention can be defined, in which the average radial distance is greater than in other sector areas. If this is the case, the cutting operation is controlled in such a way that the feed rate is reduced during one revolution of the saw blade as long as teeth of the sector area with a larger radial distance are involved in the cutting process. Due to the lower feed rate, the loads on the teeth of this sector area can be reduced during the machining process. In comparison thereto, the feed rate can be increased again as soon as teeth of a sector area with a smaller radial distance are involved in the cutting process. The method according to the invention is therefore suitable for saw blades in which the feed rate can be controlled according to the invention during one revolution of the saw blade, which is the case in many applications of saw blades with a radius in the meter range and rotational speeds in the range of 100 m/min. As a result of the reduced loading of the teeth by an appropriate control of the feed rate, maintenance or repair measures can be held back and the service life can be increased.

If permitted by the geometry of the saw blade, the division into sector areas can be carried out so precisely that each sector area contains only one tooth. The control of the feed rate would be adapted in a corresponding manner to the radial distance of each tooth. Such a procedure would be advantageous, for example, during the cutting operation in which only individual teeth are in engagement with the workpiece.

For the above-mentioned case of an eccentricity of the saw blade, on the other hand, it is proposed that the feed rate reaches a minimum speed during a cutting process effected by teeth of a sector area of the saw blade with a plurality of teeth lying next to one another with a largest average radial distance of the teeth from the center of rotation, and the feed rate reaches a maximum speed during a cutting process effected by teeth of a sector area of the saw blade with a plurality of teeth lying next to one another with a smallest average radial distance of the teeth from the center of rotation. The feed rate is thus varied during one revolution of the saw blade between a minimum speed and a maximum speed. The extent of the increase and the reduction of the feed rate in the course of the method according to the invention will generally depend on the strength of the eccentricity. If a sector area with a larger radial distance of the teeth to the center of rotation approaches the workpiece in the course of the rotation of the saw blades, the increase in the radial distance results in an apparent increase in the feed rate. At least this apparent increase in the feed rate can be compensated for by a reduction in the feed rate according to the invention. If, in turn, a sector area with a smaller radial distance from the teeth to the center of rotation in the course of the rotation of the saw blade approaches the workpiece, the decrease in the radial distance results in an apparent reduction in the feed rate. At least this apparent reduction in the feed rate is in turn provided by an increase according to the invention feed rate. It should also be mentioned at this point that the feed rate relates to a relative movement between the saw blade and the workpiece, that is to say it is irrelevant, whether the saw blade is moved relative to the workpiece or the workpiece relative to the saw blade.

As will be explained in more detail, with low eccentricity of the saw blade, for example, a triangular profile of the feed rate can be selected over a rotation of the saw blade. Alternatively, a trapezoidal profile is also proposed in that the feed rate during a cutting process effected by teeth of a sector area of the saw blade with a plurality of teeth lying next to one another with a largest average radial distance of the teeth from the center of rotation is a constant minimum speed, and the feed rate during a cutting process effected by teeth of a sector area of the saw blade with a plurality of teeth lying next to one another with a smallest average radial distance of the teeth from the center of rotation is a constant maximum speed. Phases of constant feed rate thus merge into one another via comparatively rapid changes in the feed rate, which may be advantageous, for example, in saw blades with greater eccentricity. Furthermore, the invention relates to a cutting device comprising a saw blade provided with teeth, a drive device for rotating the saw blade about a center of rotation and a feed device for achieving a relative movement of the saw blade to a workpiece, the feed device comprising a control unit for controlling the feed rate of the saw blade relative to the workpiece and the saw blade has sector areas, each with one tooth or a plurality of teeth lying next to one another. According to the invention, it is proposed that the control unit is designed to control the feed rate during a revolution of the saw blade around the center of rotation differently during the cutting process effected by the teeth of different sector areas in that the feed rate during a cutting process effected by teeth in sector areas of the saw blade with a larger radial distance of the teeth from the center of rotation or a larger average radial distance of the plurality of adjacent teeth from the center of rotation is smaller than during a cutting process effected by teeth of sector areas of the saw blade with a smaller radial distance of the teeth from the center of rotation or a smaller average radial distance of the plurality of adjacent teeth from the center of rotation.

The measurement of the radial distances of the teeth of the saw blade to the center of rotation can be carried out on a test stand at the manufacturer or user. The results can be implemented in the control unit in order to control the feed according to the invention. Preferably, however, it is proposed that a measuring device for measuring the radial distance of the teeth from a center of rotation of the saw blade is provided, which is connected to the control unit. The measurement of the radial distances of the teeth of the saw blade to the center of rotation can thus be carried out continuously, for example during an idling of the saw blade, in order to continuously check the geometric conditions on the saw blade and to compare them with the control specifications. It is also conceivable to send this measurement data to a remote monitoring device, where the geometric conditions on the saw blade are continuously monitored, are compared with the current control specifications and, if necessary, new control specifications are transmitted to the control unit, to optimize the operation of the saw blade and to increase the service life.

Figure 2:
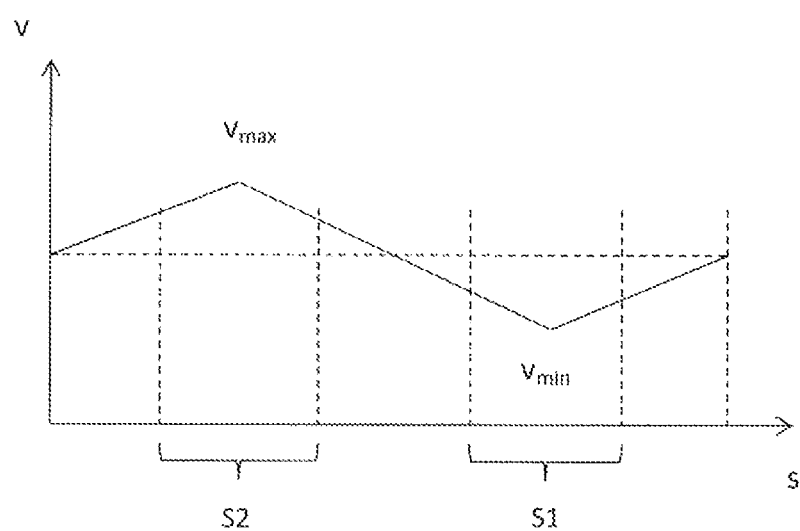
Figure 3:
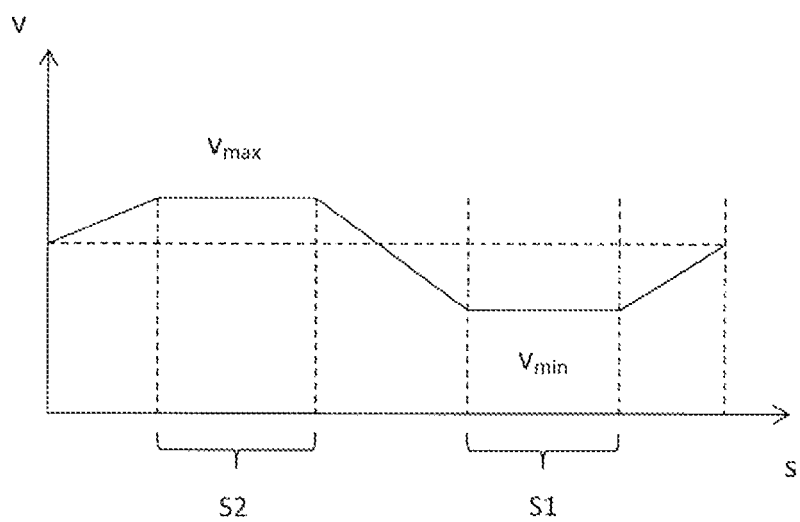

The invention is explained in more detail below on the basis of exemplary embodiments with the aid of the accompanying drawings, in which FIG. 1 shows a real example of a measurement of the radial distances of the teeth of a saw blade from the center of rotation, FIG. 2 shows a possible control curve for the feed rate with a triangular course, and FIG. 3 shows a further control curve for the feed rate with a trapezoidal profile.

Reference is first made to FIG. 1, which shows a real example of a measurement of the radial distances of the teeth of a saw blade from the center of rotation. The measurement can be carried out, for example, with the aid of optical methods, wherein a measuring device is arranged in the circumferential region of the saw blade, said measuring device being traversed by the teeth of the saw blade arranged in the circumferential region. As already mentioned, the distance of the tooth tip from the center of rotation can be used as the radial distance of the teeth, since it can be easily detected in terms of measurement technology, however, it would also be conceivable to use other reference points for determining the radial distances. The radial distance can be measured in the form of absolute values, or in the form of relative values as deviations from a reference value. FIG. 1 shows measured values for 58 teeth of a saw blade in the form of deviations from a reference value, a sector s being assigned to each tooth. For each sector s, the corresponding deviation is plotted on a radial beam, the measuring points being connected to one another in order to produce the curve shown in FIG. 1. The reference value is marked "O" in a first sector s. In the clockwise direction of FIG. 1, the radial distances of the teeth beginning with the first sector s initially decrease in order to achieve a minimum value in the eleventh sector. The radial distances of the teeth, then, increase again and reach a maximum value in the forty-second sector s. The radial distances of the teeth, thewn, decrease again and finally assume the reference value in the first sector s. The deviations are in the range from micrometers to hundredths of a millimeter. The saw blade thus exhibits an eccentricity for which two sector areas S1 and S2 can be defined with a plurality of sectors s in each case, wherein the teeth of a first sector area S1 of the saw blade comprises a plurality of adjacent teeth having a largest average radial distance from the center of rotation, and the teeth of a second sector area S2 of the saw blade comprises a plurality of adjacent teeth which have a smallest average radial distance from the center of rotation. The choice of sector boundaries for the two sector areas S1, S2, which are indicated in FIG. 1 by the dashed lines, however, is in principle not critical and merely relevant to the control profile of the feed rate v according to FIG. 3 as will be explained in more detail below.

The determination of an eccentricity of the saw blade according to FIG. 1 serves, according to the invention, for defining a feed rate v which is variable over a rotation of the saw blade, in that the feed rate v is selected to be smaller during a cutting operation effected by teeth of the first sector area S1 of the saw blade, than during a cutting operation effected by teeth of the second sector area S2 of the saw blade. During a cutting process the teeth of the saw blade do not penetrate simultaneously into the workpiece at the same time, but only the teeth of a varying number of sectors s lying next to one another, depending on the depth of penetration into the workpiece For saw blades in which the feed rate y can be changed during one revolution of the saw blade, the feed rate v can be varied for different sector areas during their respective participation in the machining process which is the case in many applications of saw blades with a radius in the meter range and rotational speeds in the range of 100 m/min.

A possible control profile for the feed rate v is shown in FIG. 2. During one revolution of the saw blade, the feed rate v is in this case varies between a minimum speed vain and a maximum speed $v_{max}$. The extent of the increase and the reduction of the feed rate v in the course of the method according to the invention is generally dependent on the strength of the eccentricity, as has already been explained. The change between the minimum speed vain and the maximum speed $v_{max}$ can thereby take place via a triangular profile of the feed rate v over a revolution of the saw blade, as can be seen in FIG. 2.

Alternatively, the control curve according to FIG. 3 can also be carried out in such a way that during the participation of teeth of the first sector area S1 at the cutting process as depicted in FIG. 1 a constant minimum speed $v_{min}$ is chosen, and during the participation of teeth of the second sector area S2 at the cutting operation as shown in FIG. 1 a constant maximum speed $v_{max}$ is chosen. These phases of constant feed rate v go into one another over comparatively rapid changes of the feed rate v, as can be seen in FIG. 3. Consequently, it is also conceivable to use more complex control curves for the feed rate v than those of FIGS. 2 and 3 when the measurement of the saw blade has shown a more complex geometry. If permitted by the geometry of the saw blade, the division into sector areas S can even be carried out so precisely that each sector area S includes only one tooth. The control of the feed rate v would be adapted in a corresponding manner to the radial distance of each tooth. Such a procedure would be advantageous, for example, during the cutting operation in which only individual teeth are in engagement with the workpiece.

The measuring device required for measuring the saw blade can also be part of the cutting device and be connected to the control unit. The measurement of the radial distances of the teeth of the saw blade to the center of rotation can thus be carried out continuously in order to continuously check the geometric conditions on the saw blade, to compare them with the current control specifications and, if necessary, to transmit new control specifications to the control unit. In this way, the operation of the saw blade can be optimized and the service life can be increased.

The invention claimed is:

1. A method for controlling the feed rate for a saw blade provided with teeth and rotating about a center of rotation relative to a workpiece during a cutting process, with sector areas each having one tooth or a plurality of teeth lying next to one another being definable on the saw blade, wherein during one revolution of the saw blade around the center of rotation, the feed rate is selected differently during a cutting process caused by teeth of different sector areas of the saw blade, the radial distance of the teeth or the average radial distance of the plurality of adjacent teeth of different sector areas differs and the feed rate is chosen to be smaller during a cutting process effected by teeth of sector areas with a larger radial distance of the teeth from the center of rotation than during one effected by teeth of sector areas with a smaller radial distance of the teeth from the center of rotation.

2. The method according to claim 1, wherein the feed rate reaches a minimum speed during a cutting process effected by teeth of a sector area of the saw blade with a plurality of teeth lying next to one another with a largest average radial distance of the teeth from the center of rotation, and the feed rate reaches a maximum speed during a cutting process effected by teeth of a sector area of the saw blade with a plurality of teeth lying next to one another with a smallest average radial distance of the teeth from the center of rotation.

3. The method according to claim 1, wherein the feed rate during a cutting process effected by teeth of a sector area of the saw blade with a plurality of teeth lying next to one another with a largest average radial distance of the teeth from the center of rotation is a constant minimum speed, and the feed rate during a cutting process effected by teeth of a sector area of the saw blade with a plurality of teeth lying next to one another with a smallest average radial distance of the teeth from the center of rotation is a constant maximum speed.

4. A cutting device comprising a saw blade provided with teeth, a drive device for rotating the saw blade about a center of rotation and a feed device for achieving a relative movement of the saw blade to a workpiece, the feed device comprising a control unit for controlling the feed rate of the saw blade relative to the workpiece and the saw blade has sector areas, each with one tooth or a plurality of teeth lying next to one another, wherein the control unit is designed to control the feed rate during a revolution of the saw blade around the center of rotation differently during the cutting process effected by the teeth of different sector areas in that the feed rate during a cutting process effected by teeth in sector areas of the saw blade with a larger radial distance of the teeth from the center of rotation or a larger average radial distance of the plurality of adjacent teeth from the center of rotation is smaller than during a cutting process effected by teeth of sector areas of the saw blade with a smaller radial distance of the teeth from the center of rotation or a smaller average radial distance of the plurality of adjacent teeth from the center of rotation.

5. The cutting device according to claim 4, wherein a measuring device for measuring the radial distance of the teeth from a center of rotation of the saw blade is provided, which is connected to the control unit.

* * * * *